(12) United States Patent
Bendig et al.

(10) Patent No.: US 10,452,634 B2
(45) Date of Patent: Oct. 22, 2019

(54) PROVIDE CONSUMER ORIENTED DATA SERVICE

(71) Applicant: MICROSOFT TECHNOLOGY LICENSING, LLC, Redmond, WA (US)

(72) Inventors: Krista Bendig, Redmond, WA (US); Mauricio Ordonez, Redmond, WA (US); Brian Jones, Redmond, WA (US); James Sturms, Redmond, WA (US); Gabriel J. Hall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 870 days.

(21) Appl. No.: 15/011,871

(22) Filed: Feb. 1, 2016

(65) Prior Publication Data
US 2017/0220615 A1    Aug. 3, 2017

(51) Int. Cl.
| | | |
|---|---|---|
| *G06F 16/23* | (2019.01) | |
| *G06F 16/21* | (2019.01) | |
| *G06F 16/22* | (2019.01) | |
| *G06F 17/22* | (2006.01) | |
| *G06F 21/62* | (2013.01) | |

(Continued)

(52) U.S. Cl.
CPC .......... *G06F 16/2322* (2019.01); *G06F 16/21* (2019.01); *G06F 16/215* (2019.01); *G06F 16/219* (2019.01); *G06F 16/2228* (2019.01); *G06F 16/2329* (2019.01);

(Continued)

(58) Field of Classification Search
CPC ......... G06F 17/30353; G06F 17/30289; G06F 17/30321; G06F 17/30356; G06F 17/30309; G06F 17/30303; G06F 21/6209; G06F 21/6218; G06F 16/2322; G06F 16/21; G06F 16/2228; G06F 16/2329; G06F 16/219;

(Continued)

(56) References Cited

U.S. PATENT DOCUMENTS

| | | |
|---|---|---|
| 6,108,651 A | 8/2000 | Guha |
| 7,266,565 B2 | 9/2007 | Diab |

(Continued)

OTHER PUBLICATIONS

"Google: About Fusion Tables", Published on: Oct. 29, 2012 Available at: https://support.google.com/fusiontables/answer/2571232.

(Continued)

*Primary Examiner* — Robert W Beausoliel, Jr.
*Assistant Examiner* — Susan F Rayyan
(74) *Attorney, Agent, or Firm* — Newport IP, LLC; Mike R. Cicero

(57) ABSTRACT

A consumer oriented data service is provided. A data collaboration service initiates operations to provide access to data from multiple sources by managing a data table of aggregate data fields based on a request from a client application. The request includes a consumer identification and data queries. An ownership of the data table is assigned based on the consumer identification. Local data fields identified in the data queries are inserted into the data table and populated with local datasets stored in the queries. External data fields identified in the data queries are inserted into the data table and populated with links to external datasets stored in external data sources.

19 Claims, 7 Drawing Sheets

(51) Int. Cl.
*G06Q 10/10* (2012.01)
*G06F 16/215* (2019.01)

(52) U.S. Cl.
CPC ...... *G06F 17/2235* (2013.01); *G06F 21/6209* (2013.01); *G06F 21/6218* (2013.01); *G06Q 10/101* (2013.01)

(58) Field of Classification Search
CPC .. G06F 16/215; G06F 17/2235; G06F 10/101; G06Q 10/101
See application file for complete search history.

(56) References Cited

U.S. PATENT DOCUMENTS

| | | | |
|---|---|---|---|
| 7,730,032 B2 | 6/2010 | Idicula et al. | |
| 7,853,961 B2 | 12/2010 | Nori et al. | |
| 8,214,355 B2 | 7/2012 | Cooper | |
| 8,607,308 B1* | 12/2013 | Langford | G06Q 40/00 705/1.1 |
| 9,396,233 B2* | 7/2016 | Douglas | G06F 17/30507 |
| 9,961,037 B2* | 5/2018 | Li | H04L 51/066 |
| 2002/0188727 A1* | 12/2002 | Lessard | H04L 29/06 709/227 |
| 2002/0188774 A1* | 12/2002 | Lessard | G06F 16/27 710/52 |
| 2003/0009536 A1 | 1/2003 | Henderson et al. | |
| 2003/0069902 A1* | 4/2003 | Narang | G06F 17/30551 |
| 2005/0262087 A1* | 11/2005 | Wu | G06F 17/30289 |
| 2006/0271383 A1* | 11/2006 | Munson | G06F 17/30584 705/1.1 |
| 2007/0276851 A1* | 11/2007 | Friedlander | G06F 17/30592 |
| 2008/0114724 A1* | 5/2008 | Indeck | G06F 17/30595 |
| 2008/0114733 A1 | 5/2008 | Friesenhahn et al. | |
| 2009/0043762 A1* | 2/2009 | Shiverick | G06F 9/451 |
| 2009/0182783 A1* | 7/2009 | Lomet | G06F 17/30353 |
| 2010/0125579 A1* | 5/2010 | Pardoe | G06F 16/86 707/736 |
| 2010/0274691 A1* | 10/2010 | Hammad | G06Q 20/3221 705/30 |
| 2010/0299608 A1 | 11/2010 | Fisher et al. | |
| 2011/0145571 A1* | 6/2011 | Schmidt-Karaca | H04L 63/0428 713/160 |
| 2015/0046786 A1 | 2/2015 | Cudich et al. | |
| 2019/0147084 A1* | 5/2019 | Pal | G06F 17/2705 |

OTHER PUBLICATIONS

Bort, Julie, "Network World: Google introduces Fusion Tables for Database Collaboration, Visualization", Published on Jun. 11, 2009 Available at: http://www.networkworld.com/article/2236073/opensource-subnet/google-introduces-fusion-tables-for-database-collaboration--visualization.html.

"Office: Make an External List from a SQL Azure table with Business Connectivity Services and Secure Store", Retrieved on: Dec. 2, 2015 Available at: https://support.office.com/en-us/article/Make-an-External-List-from-a-SQL-Azure-table-with-Business-Connectivity-Services-and-Secure-Store-466f3809-fde7-41f2-87f7-77d9fdadfc95?ui=en-US&rs=en-US&ad=US.

"YellowFin", Published on: Mar. 2, 2014 Available at: http://www.yellowfinbi.com/YFWebsite-Business-Intelligence-and-Analytics-Platform-24427#mobileBI.

Westhuizen, Pieter Van Der, "Add-In Express Blog", Published on: Jan. 27, 2012 Available at: https://www.add-in-express.com/creating-addins-blog/2012/01/27/access-database-office365/.

Melton, et al.,"SQL and Management of External Data", In Proceedings of ACM SIGMOD Record, vol. 30, Issue 1, Mar. 1, 2001, 8 Pages.

"International Search Report and Written Opinion Issued in PCT Application No. PCT/US2017/015534", dated Apr. 6, 2017, 9 Pages.

* cited by examiner

PROVIDE CONSUMER ORIENTED DATA SERVICE

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications access multiple data sources to retrieve data.

Vast number of data sources and data types complicate data aggregation. Indeed, updates, changes, and/or additions to data from different sources cause difficulties in management of data consumed by a client application. While maintaining the data from variety of data sources, an additional layer of complication faced by a consumer includes ownership of the data. Complications with multiple data sources and vast number of data types may lead to mismanagement of data associated with a consumer.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a consumer oriented data service. In some examples, a data collaboration service may receive a request to create a data table. The request may include a consumer identification and data queries. The data table may be created in response to the request. An ownership of the data table may be assigned to the consumer identification. Next, local data fields may be inserted into the data table in response to an identification of the local data fields in the data queries. The local data fields may also be populated with datasets identified in the data queries. Similarly, external data fields associated external data sources may be inserted into the data table in response to another identification of the external data fields in the data queries. The external data fields may be populated with external data links referring to the external datasets stored in the external data sources.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
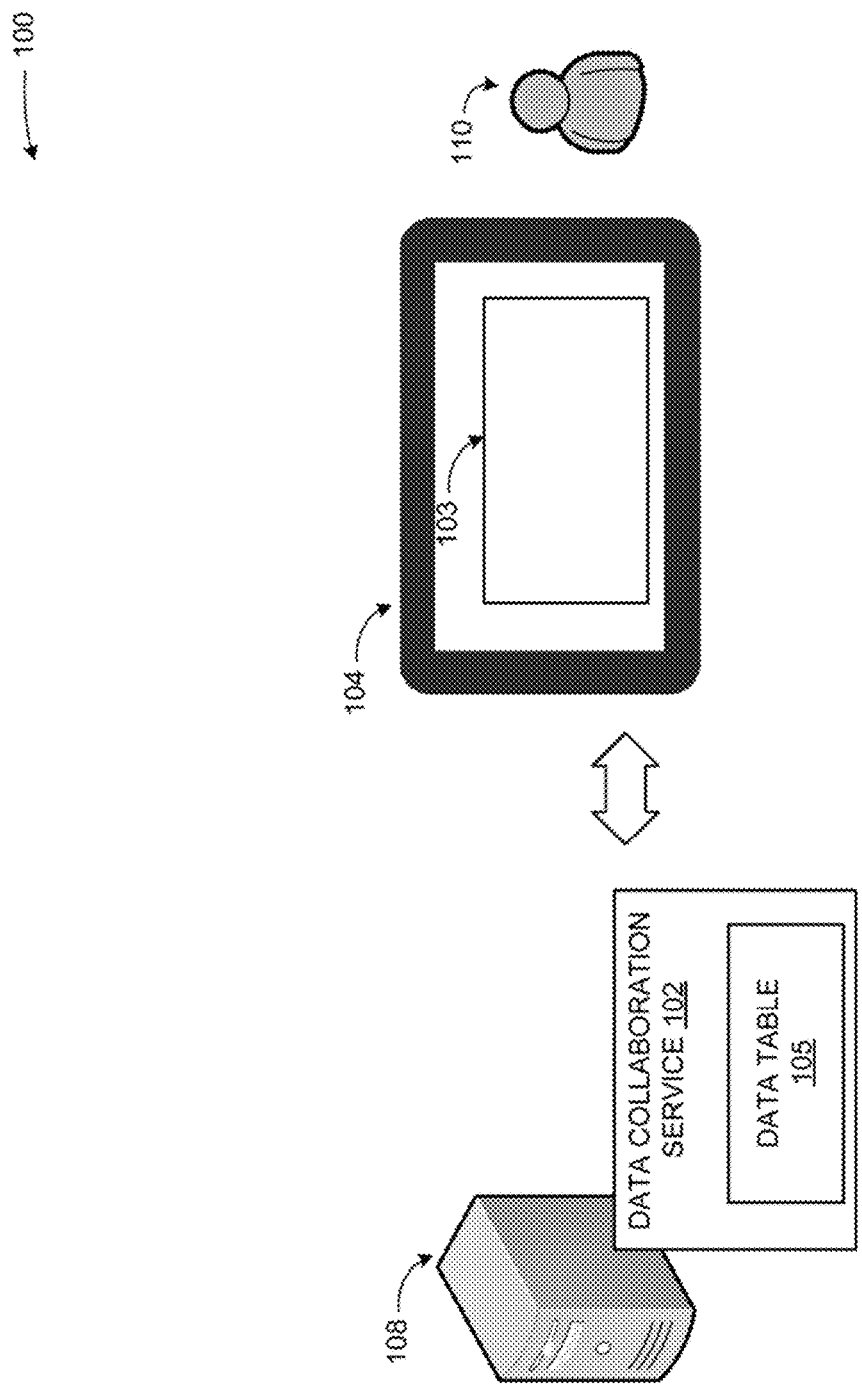
FIG. 1 is a conceptual diagram illustrating an example of providing a consumer oriented data service, according to embodiments.

As briefly described above, a data collaboration service provides a consumer oriented data service. In an example scenario, the data collaboration service may create (or manage) a data table in response to a request from a client application. The data table may be stored locally or by an external data source. The request may include a consumer identification and a data query. The data query may include a description of a data field (also known as a data column). The description may specify type of data to store in the data field.

An ownership of the data table may be assigned to the consumer identification. The consumer identification may include an identifier associated with a consumer. Next, in response to an identification of a local data field in the data query, the local data field may be inserted into the data table. The local data field may be populated with a dataset identified in the data query.

An external data field associated with an external data source may similarly be inserted into the data table in response to another identification of the external data field in the data query. The external data field may be populated with external link(s) referring to an external dataset stored in the external data source. The data table may also be provided to the client application. While a "data table" is used as an example herein, the data may also be stored in comparable structured or unstructured formats, such as databases, multidimensional data structures, for example.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a consumer oriented data service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing a consumer oriented data service, according to embodiments.

In diagram 100, a server 108 may execute a data collaboration service 102. The server 108 may include a physical server providing one or more services to client devices. A service may include an application performing operations in relation to a client application and/or a subscriber, among others. The server 108 may include and/or is part of a workstation, a data warehouse, and/or a data center, among others.

The server 108 may execute the data collaboration service 102 to manage consumer data provided by multiple data sources. The data collaboration service 102 may initiate operations to provide consumer data in response to a received request to create (or manage) a data table. The request may be received through a communication module of the data collaboration service 102 from a client application 103 executed by the client device 104. The client application 103 may include a variety of applications that may provide a user interface to a consumer 110 to manage and consume data.

The request may include a consumer identification of the consumer 110 and data queries. The consumer 110 may include an individual consumer and a group of consumers. Next, the data collaboration service 102 may create a data table 105 based on the description(s) in the data queries. An ownership of the data table 105 may be assigned to the consumer identification to prevent any entity (other than the consumer 110) from deleting the data table 105. Local data field(s) may be inserted into the data table in response to an identification of the local data field(s) in the data queries. A data field may be a data column that stores data items of a specific data type such as a text, binary data, a document and/or a visual content, among others. The local data field(s) may be populated with dataset(s) identified in the data queries. Alternatively, the queries may describe a location and arrange of a local dataset stored within a local data source. The local data set may retrieved from the location and the range within the local data source and inserted into the local data field(s).

External data field(s) may also be inserted into the data table in response to another identification of the external data field(s) in the data queries. The external data field(s) may be associated with external data sources such as a communication data source, a calendar data source, a project data source, and a content data source, among others. The external data field(s) may include a communication, a communication conversation, a calendar item, a task, and/or a content, among others. The external data field(s) may be populated with external link(s) referring to external dataset(s) stored in the external data sources. The data queries may describe what range of external data item(s) to associate with the external link(s) to the external dataset(s).

The server 108 may communicate with the client device 104 through a network. The network may provide wired or wireless communications between nodes such as the client device 104, or the server 108, among others. Previous example(s) to manage consumer data through the data collaboration service 102 is not provided in a limiting sense. Alternatively, the data collaboration service 102 may manage the data table 105 at a desktop application, a workstation application, and/or a server application, among others. The client application 103 may also include a client interface of the data collaboration service 102.

The consumer 110 may interact with the client application 103 with a keyboard based input, a mouse based input, a voice based input, a pen based input, and a gesture based input, among others. The gesture based input ma include one or more touch based actions such as a touch action, a swipe action, and a combination of each, among others.

While the example system in FIG. 1 has been described with specific components including the server 108, the data collaboration service 102, embodiments are not limited to these components or system configurations and can be implemented with other system configuration employing fewer or additional components.

Figure 2:
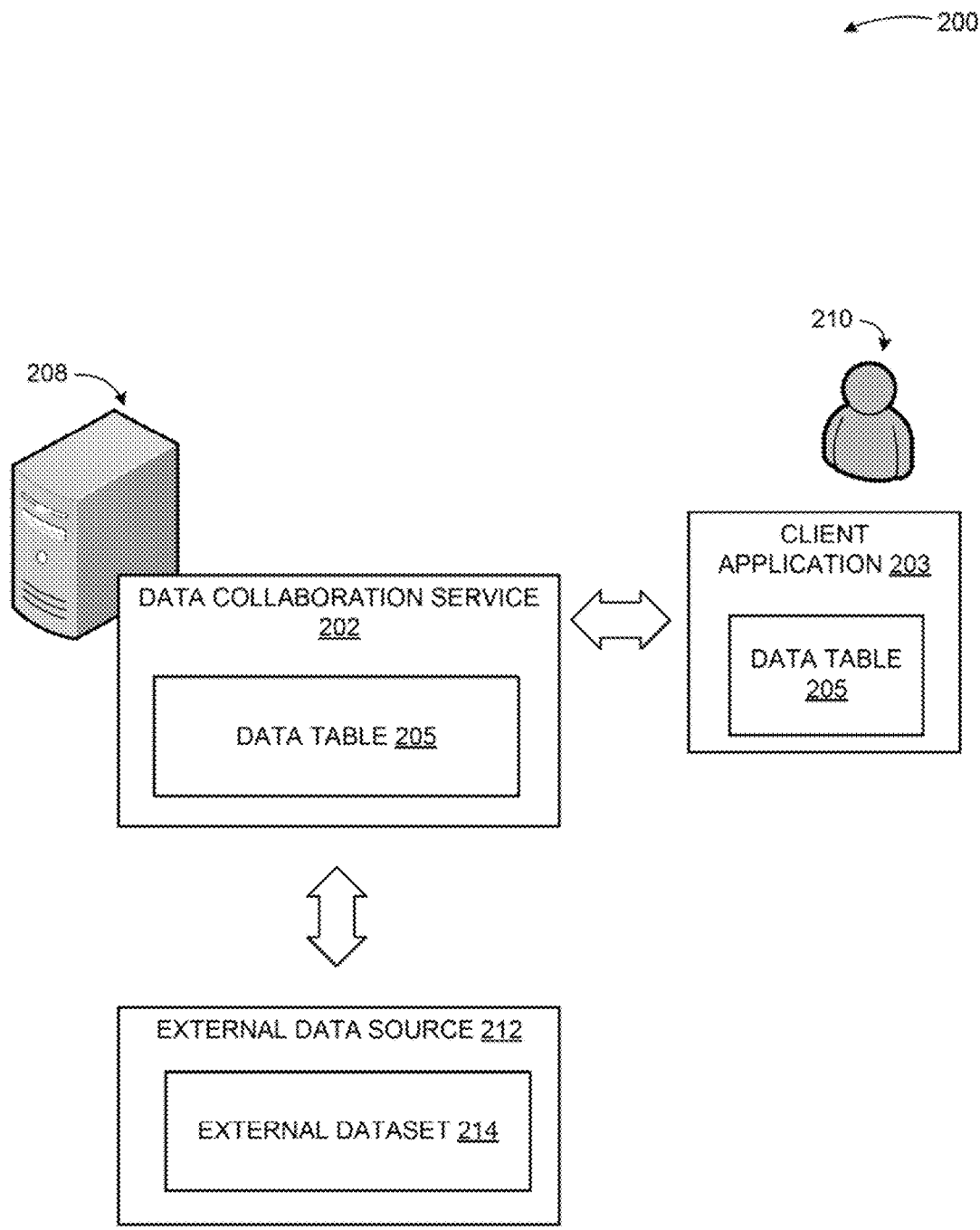
FIG. 2 is a display diagram illustrating an example of a scheme to provide a consumer oriented data service, according to embodiments.

FIG. 2 is a display diagram illustrating an example of a scheme to provide a consumer oriented data service, according to embodiments.

In a diagram 200, a server 208 may provide a data collaboration service 202 to manage data from multiple data sources for a consumer 210. The consumer 210 may include an individual consumer or a group of consumers. The consumer 210 may be associated with an organization.

In an example scenario, the consumer 210 may interact with a client application 203 to do a variety of functions associated with the consumer such as social networking, work tasks, and/or among others. The client application 203 may generate a request to create a data table 205 in relation to the interactions by the consumer 210. The request may include a consumer identification associated with the consumer 210 and one or more data queries that describe what type of data to retrieve from one or more external data sources. The data queries may also include datasets to populate local data fields to be inserted into the data table 205. A data field may correspond to a data column within the data table 205 that store a data set of a specified data type such as text based data, binary based data visual, data, documents, and/or among others. Alternatively, the queries may also describe additional data sets to be used for an addition or a modification of existing data sets in the data table 205.

The data collaboration service 202 may receive the request from the client application 203. The request may include attributes of the data table 205 such as a tide, a size, a default permission, and/or among others. The data table 205 may be created by the data collaboration service 202. An ownership of the data table 205 may also be assigned to the customer identification. Deletion requests to remove the data table 205 may be rejected if the requesting entity is not authorized through the customer identification. The deletion requests associated with the data table 205 may be fulfilled if the requesting entity is authorized through the customer identification or is identified as an entity authorized by the customer identification to remove the data table 205.

If a local data field is detected within the data queries, the local data field may be inserted into the data table 205. The local data field may also be populated with a corresponding local data set identified in the data query. For example, a local text based data field may be allocated in the data table 205 in response to detecting a description of the local text based data field in the data query (sent by the client application 203). The local text based data field may be populated with text based content found in the data query.

If an external data field is detected within the data queries, the external data field is inserted into the data table 205. The external data field is populated with a link to an external dataset 214 stored within an external data source 212. For example, an external image based data field may be inserted into the data table 205 in response to detecting a description of the image based data field in the data query (sent by the client application 203). The external image based data field may be populated with links to images in the external source 212 as specified by the data queries.

Figure 3:
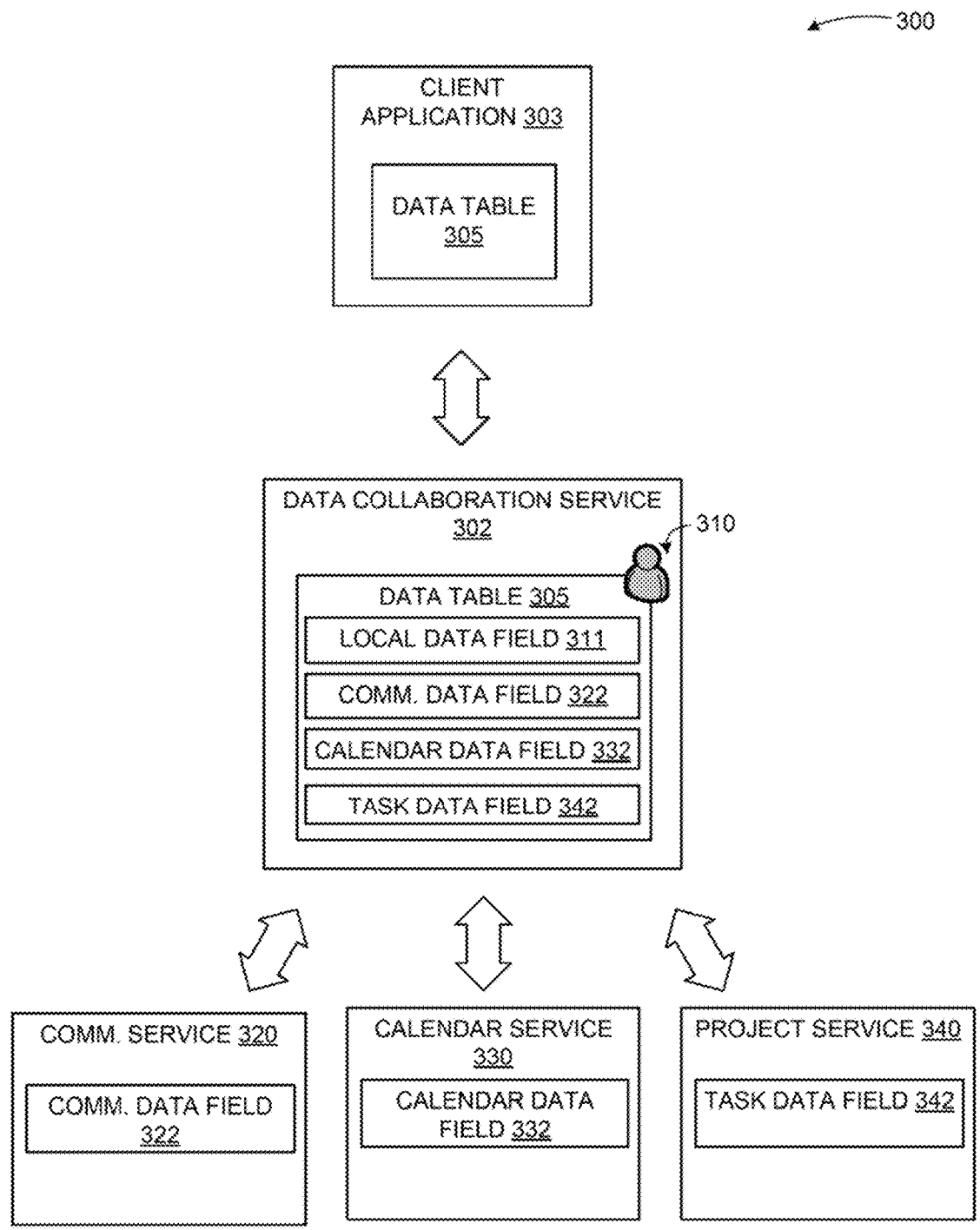
FIG. 3 is a display diagram illustrating components of a scheme to provide a consumer oriented data service, according to embodiments.

FIG. 3 is a display diagram illustrating components of a scheme to provide a consumer oriented data service, according to embodiments.

In a diagram 300, a data collaboration service 302 may manage data from multiple sources based on an ownership of a data table 305 by a consumer 310. In response to a request from a client application 303, the data collaboration service 302 may create or modify the data table 305. An ownership of the data table 305 may be assigned to a consumer identification of the consumer 310. The ownership of the data table 305 may also be modified to another consumer if the other consumer is authorized to receive the ownership from the consumer 310.

The data table 305 may have a local data field 311 or external data fields such as a communication data field 322, a calendar data field 332, and a task data field 342. The local data field may store local datasets within the data table 305. The external data fields may store links to external datasets hosted by external data sources such a communication service 320, a calendar service 330, and/or a project service 340, among others.

In an example scenario, the data collaboration service 302 may populate a communication data field 322 with a link to an external dataset of communications (or conversations) managed by the communication service 320. The data query (within the request sent by the client application 303) may describe a selection of the external dataset of communications for which to create a link within the communication data field 322 of the data table 305. Similarly, links may be inserted into the calendar data field 332 and task data field 342 based on descriptions of selections of external datasets managed by the calendar service 330 and the project service 340. Any modifications, updates, additions, and/or deletions of data items may be transmitted to the external datasets managed by the communication service 320, calendar service 330, and/or project service 340 through the links stored in the respective external data fields in the data table 305. The links to the external datasets may be modified based on changes to the external datasets transmitted through the external data sources, as well.

Examples of external data fields, external datasets, and/or external data sources were not provided in a limiting sense. Other external data fields may be created and or managed by the data collaboration service 302 within the data table 305 to store links to other external datasets in other external data sources.

Figure 4:
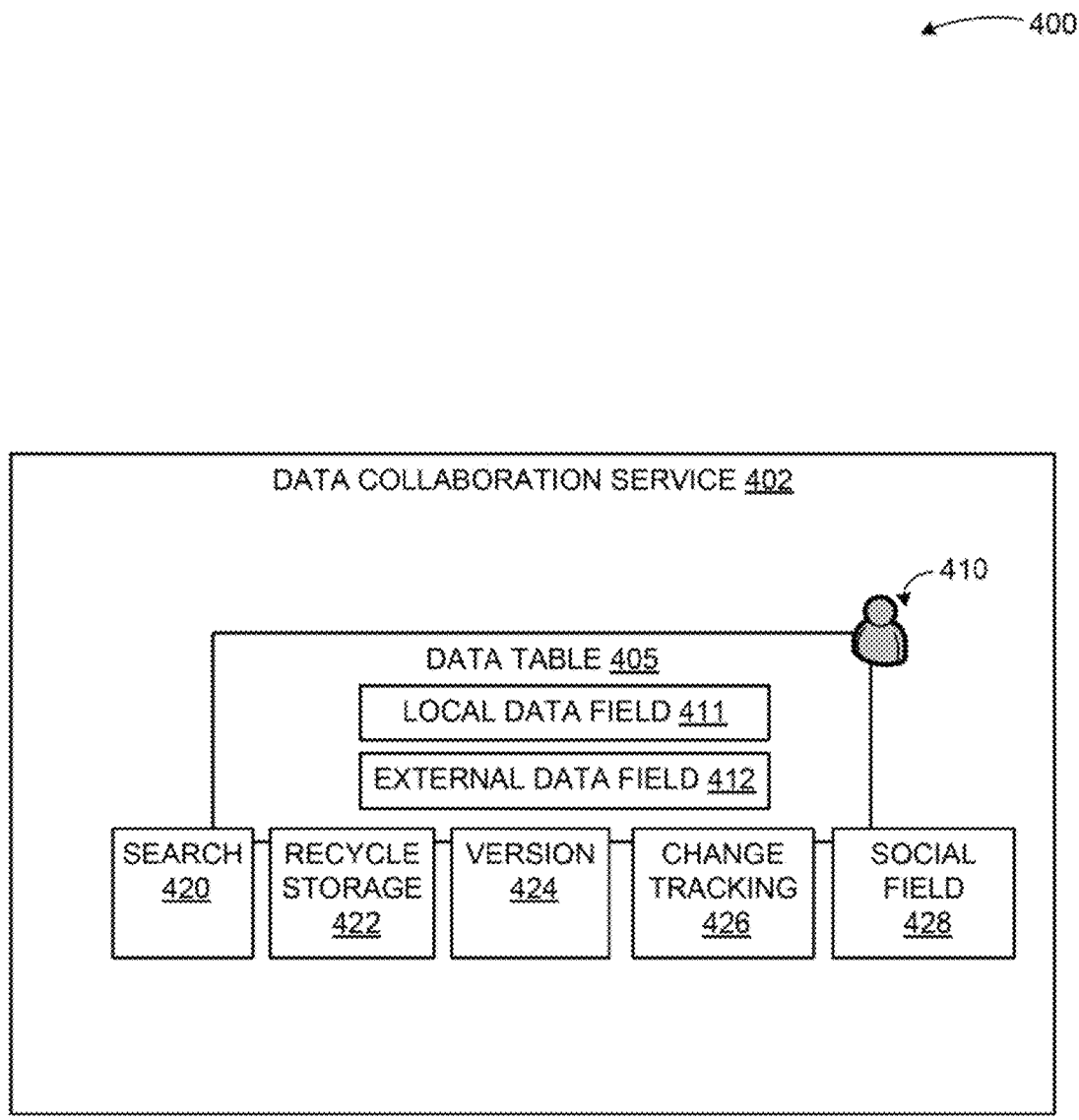
FIG. 4 is a display diagram illustrating attributes of a data collaboration service, according to embodiments.

FIG. 4 is a display diagram illustrating attributes of a data collaboration service, according to embodiments.

In a diagram 400, a data collaboration service 402 may create and maintain a data table 405. The data table 405 may include a local data field 411 storing local data and an external data field 412 storing links to external datasets stored by external data sources.

The data collaboration service 402 may create an index (or indices) of datasets or links to external datasets in the data table 405 based on data queries that specify features for a search 420 to associate with the data table 405. For example, some of the data queries may describe an index that orders all text based data fields alphabetically in the data table 405. The data collaboration service 402 may create the index ordering the local datasets and links to the external datasets of text based data fields, stored in the data table 405. The index may be made available to local and external search features for rapid access to the searched items in the data table 405.

Alternatively, the data collaboration service 402 may receive instructions from an external search provider to add features for another search to the data table. Other indexes may be created based on the datasets in the data table 405 based on the instructions. The instructions may identify attributes of indexes.

In another example scenario, the data collaboration service 402 may receive instructions to delete the data table 405. The instructions may be verified to confirm an authorization by a consumer 410 as the owner of the data table 405. After the confirmation, the data table 405 may be moved to a recycle storage 422. The data table 405 may be moved to the recycle storage to make the data table 405 available for retrieval upon an instruction to do as such.

In yet another example scenario, the data collaboration service 402 may save a snapshot of the data table as a version 424 of the data table based on a versioning policy. The versioning policy may be based on a scheduled policy (such as recurrence within a duration) and/or an on-demand policy (such as based on an event or a request), among other policies. The versioning policy may be provided by a client application or may be a default configuration of the data collaboration service 402. The consumer 410 may be granted an authority to modify or create the versioning policy for the data table 405.

The data collaboration service 402 may also provide change tracking 426 in relation to change(s) applied to the data table 405. For example, after detecting a change to be applied to an item in the data table, the data collaboration service 402 may record attributes of the change to track the change. The attributes may include a consumer associated with the change, a timestamp of the change, and/or a description of the change. Next, the change may be applied to the item.

In another example scenario, a request may be received to associate a social field 428 with an item in the data table 405. The social field 428 may record a social input such as an approval, a disapproval, a vote for, and/or a vote against the item, among other social inputs. Next, the item may be associated with the social field 428. New social inputs, associated with the item may be recorded in the social field 428.

Furthermore, a notification associated with an item in the data table 405 may also be managed by the collaboration service 402. In response to receiving a request to follow an item in the data table, the data collaboration service 402 may move the item to a notification field. The notification field may be a trigger type data field that triggers a notification in response to an event. Next, a notification may be generated based on an event that triggers a rule associated with the notification field. The rule may be a default behavior rule applied to the notification field (such as generate an email in response to a trigger event) or a rule specified by the consumer 410. The notification may be transmitted to the client application to alert the consumer 410 of the trigger event associated with the item in the notification field.

The data collaboration service 402 may also manage permissions associated with item(s) in the data table 405 (or the entirety of the data table 405) based on a granularity as dictated by the consumer 410. For example, a consumer view permission and a consumer edit permission may be applied to lock an item or multiple items in the data table 405 to interactions allowed by the consumer 410. The item(s) may be owned by the consumer 410. Next, the data collaboration service 402 may provide the item(s) to the consumer 410 for editing and viewing. Alternatively, access to the item(s) may be restricted to other consumer(s) who may have permission to access the data table 405 based on permission set by the consumer 410. Furthermore, the consumer 410 may be denied access to other item(s) in the data table 405 that are owned by other consumer(s).

The data collaboration service 402 may also apply an organization view permission and/or an organization edit permission to item(s) inserted into the data table 405 (or the entirety of the data table 405). The item(s) may be owned by the consumer 410. The consumer 410 may be identified as a member of the organization. Next, the item(s) may be provided to other consumer(s) fix editing and viewing as long the other consumer(s) are members of the organization. Alternatively, an access to the item(s) may be denied to an external consumer where the external consumer is not a member of the organization.

In another example scenario, the data collaboration service 402 may apply an append permission to item(s) inserted into the data table 405. Next, a change to the item(s) may be accepted where the change adds content to the item(s). Alternatively, another change to the item(s) may be rejected where the other change modifies the item(s).

In another example scenario, the data collaboration service 402 may apply a finalize permission to item(s) inserted in the data table 405. As a result, any subsequent change to the item(s) may be rejected.

As discussed above, the data collaboration service may be employed to perform operations to automate a consumer oriented data service. An increased user efficiency with the client application 103 may occur as a result of providing data from multiple sources through a data collaboration service 102. Additionally, local and external data field management by the data collaboration service 102 may reduce processor load, increase processing speed, conserve memory, and reduce network bandwidth usage.

Embodiments, as described herein, address a need that arises from a lack of efficiency to manage local and external datasets of a consumer managed by the client application 103 or external data sources. The actions/operations described herein are not a mere use of a computer, but address results that are a direct consequence of software used as a service offered to large numbers of users and applications.

The example, scenarios and schemas in FIG. 1 through 4 are shown with specific components, data types, and configurations. Embodiments are not limited to systems according to these example configurations. Providing a consumer oriented data service may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
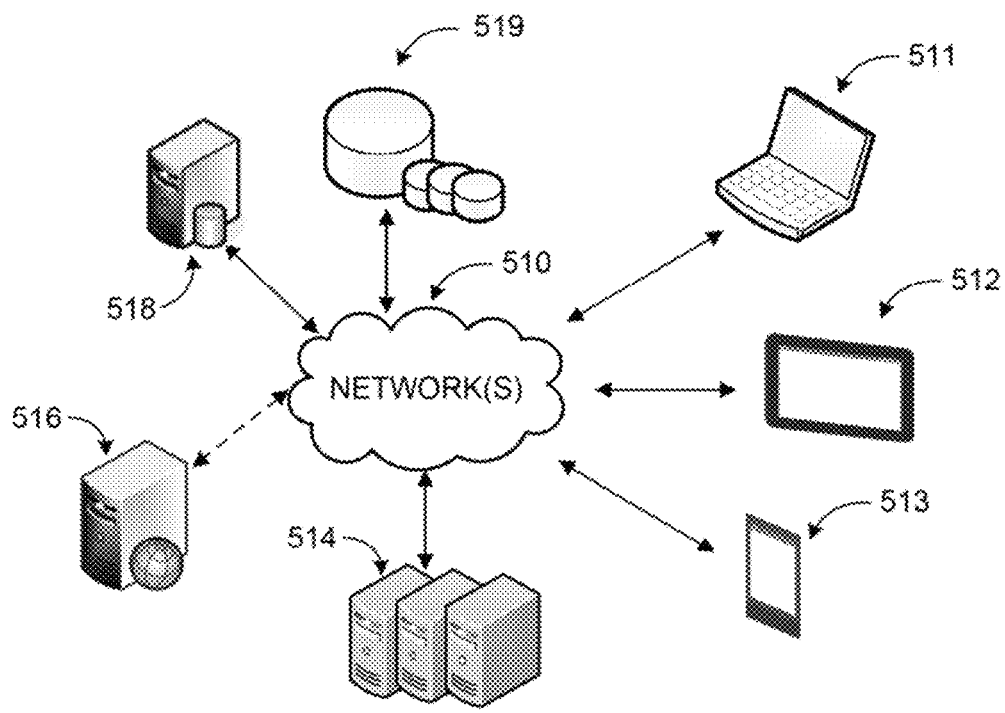
FIG. 5 is a simplified networked environment, where a system according to embodiments may be implemented.

FIG. 5 is an example networked environment, where embodiments may be implemented. A data collaboration service configured to provide a consumer oriented data service may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A data collaboration service may manage a data table based on a request from a client application that includes a consumer identification and data queries. An ownership of the data table may be assigned to the consumer identification. Local data fields identified in the data queries may be inserted into the data table and populated with local datasets stored in the queries. External data fields identified in the data queries may be inserted into the data table and populated with links to external datasets stored in external data sources. The data collaboration service may store data associated with the feature in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as, acoustic, RF, infrared and other wireless media.

Many other configurations of computing devices, applications, data sources, and data distribution systems may be employed to provide a consumer oriented data service. Furthermore the networked environments discussed in FIG. 5 are for illustration purposes only. Embodiments are not limited to the example applications, modules, or processes.

Figure 6:
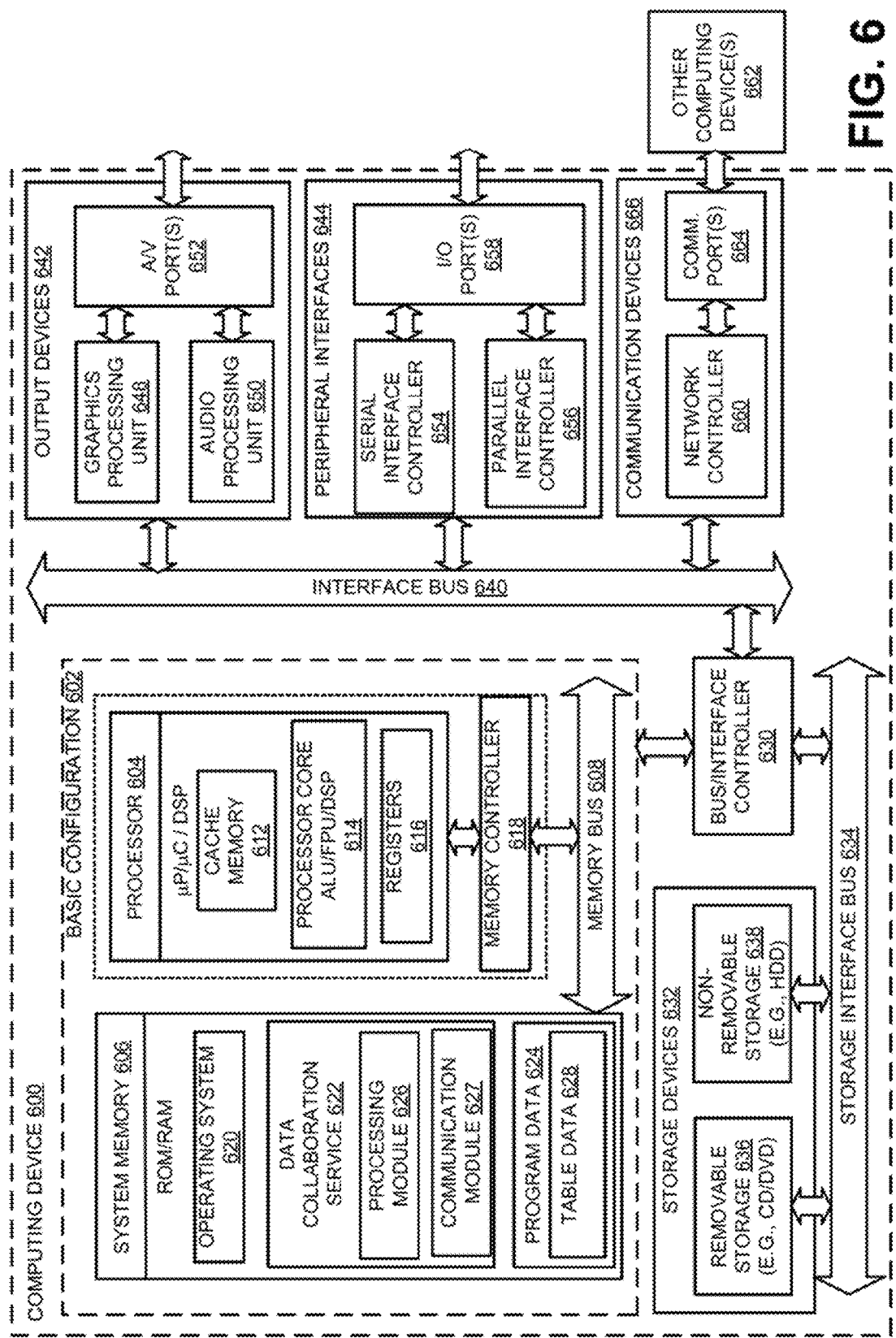
FIG. 6 is a block diagram of an example computing device, which may be used to provide a consumer oriented data service, according to embodiments.

FIG. 6 is a block diagram of an example computing device, which may be used to provide a consumer oriented data service, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a data collaboration service 622, and a program data 624. The data collaboration service 622 may include components such as a processing module 626 and a communication module 627. The processing module 626 and the communication module 627 may execute the processes associated with the data collaboration service 622. The communication module 627 may receive a request from a client application to create or manage a data table. The processing module 626 may manage the data table based an a request from a client application that includes a consumer identification and data queries. An ownership of the data table may be assigned to the consumer identification. Local data fields identified in the data queries may be inserted into the data table and populated with local datasets stored in the queries. External data fields identified in the data queries may be inserted into the data table and populated with links to external datasets stored in external data sources.

Input to and output out of the data collaboration service 622 may be transmitted through a communication device associated with the computing device 600. An example of the communication device may include a networking device that may be communicatively coupled to the computing device 600. The networking device may provide wired and/or wireless communication. The program data 624 may also include, among other data, table data 628, or the like, as described herein. The table data 628 may include data items, data rows, data fields (also known as data columns), among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a consumer oriented data service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
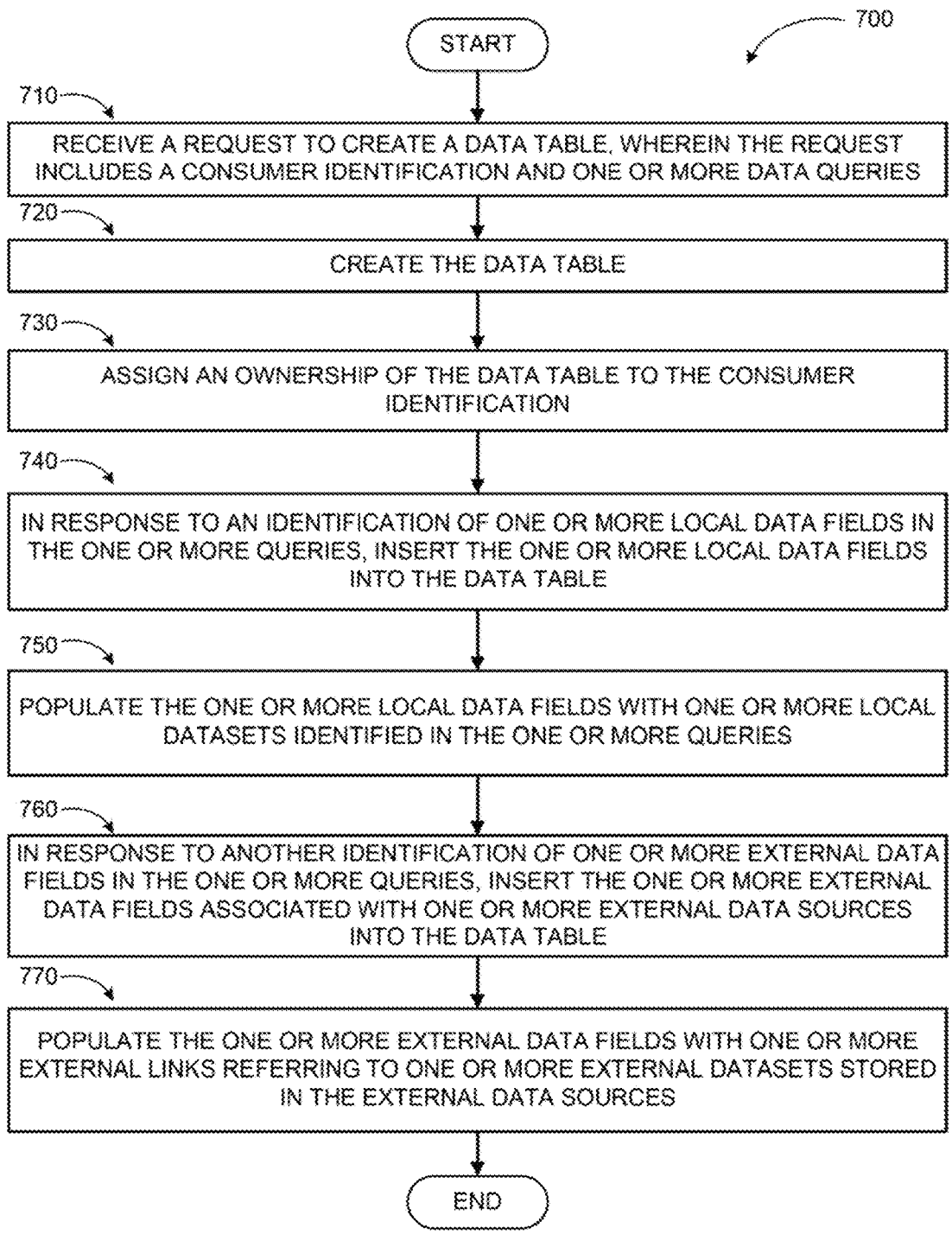
FIG. 7 is a logic flow diagram illustrating a process for providing a consumer oriented data service, according to embodiments.

FIG. 7 is a logic flow diagram illustrating a process for providing a consumer oriented data service, according to embodiments. Process 700 may be implemented on a computing device, such as the computing device 600 or another system.

Process 700 begins with operation 710, where the data collaboration service receive a request to create a data table. The request includes a consumer identification and data queries. At operation 720 the data table may be created. At operation 730, an ownership of the data table may be assigned to the consumer identification. The consumer identification may include an identifier of a consumer interacting with the client application.

Next, at operation 740, in response to an identification of local data field(s) in the queries, the local data field(s) are inserted into the data table. The local data field(s) may be populated with local dataset(s) stored in the queries at operation 750. At operation 760, in response to another identification of external data field(s) in the queries, the external data field(s) may be inserted into the data table. The external data field(s) may be associated with external data source(s). The external data field(s) may be populated with external link(s) referring to the external dataset(s) stored in the external data source(s) at operation 770.

The operations included in process 700 are for illustration purposes. Providing a consumer oriented data service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a server for providing consumer oriented data service is described. The server includes a communication device, a memory configured to store instructions associated with a data collaboration service, processor(s) coupled to the memory and the communication device. The processor(s) execute the data collaboration service in conjunction with the instructions stored in the memory. The data collaboration service includes a communication and a processing module. The communication module is configured to receive a request to create a data table, where the request includes a consumer identification and one or more data queries. The processing module is configured to create the data table, assign an ownership of the data table to the consumer identification, in response to an identification of one or more local data fields in the one or more data queries, insert the one or more local data fields into the data table, populate the one or more local data fields with one or more local datasets identified in the one or more data queries, in response to another identification of one or more external data fields in the one or more data queries, insert the one or more external data fields associated with one or more external data sources into the data table, and populate the one or more external data fields with one or more external links referring to one or more external datasets stored in the one or more external sources.

In other examples, the consumer identification refers to one of: an individual consumer and a group of one or more consumers. The processing module is further configured to query a personnel source to identify one or more consumers associated with the consumer identification and provide a view permission and an edit permission to the one or more consumers to view and edit the data table. The processing module is further configured to create one or more indexes of one or more datasets in the data table based on a subset of the one or more data queries identifying one or more search features to add to the data table. The processing module is further configured to receive one or more instructions from an external search provider to add one or more search features to the data table and create one or more indexes of the one or more datasets in the data table based on the one or more instructions.

In further examples, the processing module is further configured to receive an instruction to delete the data table, where the instruction is authorized by the consumer identification and move the data table to a recycle storage, where the data table is available for retrieval upon demand. The processing module is further configured to save a snapshot of the data table as a version of the data table based on a versioning policy, where the versioning policy is based on one or more of: a scheduled policy and an on-demand policy. The processing module is farther configured to detect a change to be applied to an item in the data table, record attributes of the change including a consumer associated with the change, a timestamp of the change, and a description of the change, and apply the change to the item.

In other examples, the processing module is further configured to receive another request to associate a social field with an item in the data table; where the social field records a social input including one or more of an approval, a disapproval, a vote for and another vote against the item, associate the item with the social field, receive a new social input associated with the item, and record the new social input in the social field. The processing module is further configured to receive another request to follow an item in the data table, move the item to a notification field, generate a notification based on an event triggering one or more rules associated with the notification field, and provide the notification to the communication module for a transmission to a client application.

In some examples, a method executed on a computing device for providing consumer oriented data service is described. The method includes creating a data table in response to a request from a client application, where the request includes a consumer identification and one or more data queries, assigning an ownership of the data table to the consumer identification, in response to an identification of one or more local data fields in the one or more data queries, inserting the one or more local data fields into the data table, populating the one or more local data fields with one or more local datasets identified in the one or more data queries, in response to another identification of one or more external data fields in the one or more data queries, inserting the one or more external data fields associated with one or more external data sources into the data table, populating the one or more external data fields with one or more external links referring to one or more external datasets stored in the one or more external sources, and providing the data table to the client application.

In other examples, the one or more external sources include one or more of a communication data source, a calendar data source, a project data source, and a content data source. The method further includes applying a consumer view permission and a consumer edit permission to one or more items inserted into the data table, where the one or more items are owned by a consumer, providing the one or more items to the consumer for editing and viewing, and denying an access to one or more other items in the data table to the consumer, where the one or more other items are owned by another consumer. The method further includes applying an organization view permission and an organization edit permission to one or more items inserted into the data table, where the one or more items are owned by a consumer within an organization, providing the one or more items to another consumer for editing and viewing, where the other consumer is within the organization, and denying an access to the one or more items to an external consumer, where the external consumer is not within the organization.

In further examples, the method further includes applying an append permission to one or more items inserted into the data table, accepting a change to the one or more items, where the change adds content to the one or more items, and rejecting another change to the one or more items, where the other change modifies the one or items. The method further includes applying a finalize permission to one or more items inserted into the data table and rejecting a change to the one or more items.

In some examples, a computer-readable memory device with instructions stored thereon for providing consumer oriented data service is described. The instructions include actions that are similar to the actions of the method.

In some examples, a means for providing consumer oriented data service is described. The means for providing consumer oriented data service include a means for receiving a request to create a data table, where the request includes a consumer identification and one or more data queries, a means for creating the data table, a means for assigning an ownership of the data table to the consumer identification, a means for in response to an identification of one or more local data fields in the one or more data queries, inserting the one or more local data fields into the data table, a means for populating the one or more local data fields with one or more local datasets identified in the one or more data queries, a means for in response to another identification of one or more external data fields in the one or more data queries, inserting the one or more external data fields associated with one or more external data sources into the data table, and a means for populating the one or more external data fields with one or more external links referring to one or more external datasets stored in the one or more external sources.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server for providing a consumer-oriented data service, the server comprising:
  a memory storing store instructions associated with a data collaboration service;
  one or more processors coupled to the memory, the one or more processors executing the data collaboration service in accordance with the instructions stored in the memory, wherein the data collaboration service includes:
    a communication module configured to:
      receive a request to create a data table from a client application that is operating on a client device, wherein the request includes a consumer identification and one or more data queries that describe a selection of one or more external datasets for which to create one or more external links within the data table, and wherein the one or more external datasets are external to both the data collaboration service and the client device;
    a processing module configured to:
      create the data table;
      assign an ownership of the data table to the consumer identification;
      in response to a first identification of one or more local data fields in the one or more data queries, insert the one or more local data fields into the data table;
      populate the one or more local data fields with one or more local datasets identified in the one or more data queries;
      in response to a second identification of one or more external data fields in the one or more data queries, insert the one or more external data fields associated with one or more external sources into the data table; and populate the one or more external data fields with the one or more external links referring to the one or more external datasets stored in the one or more external sources.

2. The server of claim 1, wherein the consumer identification refers to one of: an individual consumer, or a group of one or more consumers.

3. The server of claim 1, wherein the processing module is further configured to:
query a personnel source to identify a particular consumer associated with the consumer identification; and
provide a view permission and an edit permission to the particular consumer with respect to the data table, wherein the view permission and the edit permission enables the one or more consumers to edit one or more particular items within the data table and denies access to other items within the data table.

4. The server of claim 1, wherein the processing module is further configured to:
create one or more indexes of one or more datasets in the data table based on a subset of the one or more data queries identifying one or more search features to add to the data table.

5. The server of claim 1, wherein the processing module is further configured to:
receive one or more instructions from an external search provider to add one or more search features to the data table; and
create one or more indexes of one or more datasets in the data table based on the one or more instructions.

6. The server of claim 1, wherein the processing module is further configured to:
receive an instruction to delete the data table, wherein the instruction is authorized by the consumer identification; and
move the data table to a recycle storage, wherein the data table is available for retrieval upon demand.

7. The server of claim 1, wherein the processing module is further configured to:
save a snapshot of the data table as a version of the data table based on a versioning policy, wherein the versioning policy is based on one or more of: a scheduled policy and an on-demand policy.

8. The server of claim 1, wherein the processing module is further configured to:
detect a change to be applied to an item in the data table;
record attributes of the change including a consumer associated with the change, a timestamp of the change, and a description of the change; and
apply the change to the item.

9. The server of claim 1, wherein the processing module is further configured to:
receive another request to associate a social field with an item in the data table; wherein the social field records a social input including one or more of: an approval of the item, a disapproval of the item, a vote for the item, or a vote against the item; and
associate the item with the social field.

10. The server of claim 9, wherein the processing module is further configured to:
receive a new social input associated with the item; and
record the new social input in the social field.

11. The server of claim 1, wherein the processing module is further configured to:
receive another request to follow an item in the data table;
move the item to a notification field;
generate a notification based on an event triggering one or more rules associated with the notification field; and
provide the notification to the communication module for a transmission to a client application.

12. A method executed on a server computing device for providing a consumer-oriented data service, the method comprising:
creating a data table in response to a request from a client application, wherein the request includes one or more data queries and a consumer identification that identifies at least a first consumer that is interacting with the client application;
assigning an ownership of the data table to a plurality of consumers that includes at least the first consumer and a second consumer that is different than the first consumer;
in response to an identification of one or more local data fields in the one or more data queries, inserting the one or more local data fields into the data table;
populating the one or more local data fields with one or more local datasets identified in the one or more data queries;
in response to another identification of one or more external data fields in the one or more data queries, inserting the one or more external data fields associated with one or more external sources into the data table;
populating the one or more external data fields with one or more external links referring to one or more external datasets stored in the one or more external sources;
applying a first permission to enable the first consumer to edit one or more first items within the data table that are owned by the first consumer and to restrict the first consumer from editing one or more second items within the data table that are owned by the second consumer;
applying a second permission to enable the second consumer to edit the one or more second items within the data table that are owned by the second consumer and to restrict the second consumer from editing the one or more first items within the data table that are owned by the first consumer, and
providing access to the data table to the first consumer in accordance with the first permission and to the second consumer in accordance with the second permission.

13. The method of claim 12, wherein the one or more external sources include one or more of a communication data source, a calendar data source, a project data source, and a content data source.

14. The method of claim 12, further comprising:
applying an organization view permission and an organization edit permission to one or more items inserted into the data table, wherein the one or more items are owned by a consumer within an organization;
providing the one or more items to another consumer for editing and viewing, wherein the other consumer is within the organization; and
denying an access to the one or more items to an external consumer, wherein the external consumer is not within the organization.

15. The method of claim 12, further comprising:
applying an append permission to one or more items inserted into the data table;
accepting a change to the one or more items, wherein the change adds content to the one or more items; and
rejecting another change to the one or more items, wherein the other change modifies the one or more items.

16. The method of claim 12, further comprising:
applying a finalize permission to one or more items inserted into the data table; and
rejecting a change to the one or more items.

17. A physical computer-readable storage medium with instructions stored thereon for providing a consumer-oriented data service, the instructions comprising:
creating a data table in response to a request from a client application, wherein the request includes a consumer identification and one or more data queries;
assigning an ownership of the data table between at least a first consumer and a second consumer in accordance with the consumer identification;
in response to an identification of one or more local data fields in the one or more data queries, inserting the one or more local data fields into the data table;
populating the one or more local data fields with one or more local datasets identified in the one or more data queries;
in response to another identification of one or more external data fields in the one or more data queries, inserting one or more external data fields associated with one or more external sources into the data table;
populating the one or more external data fields with one or more external links referring to one or more external datasets stored in the one or more external sources;
applying a first permission to enable the first consumer to edit one or more first items within the data table that are owned by the first consumer and to restrict the first consumer from editing one or more second items within the data table that are owned by the second consumer;
applying a second permission to enable the second consumer to edit the one or more second items within the data table that are owned by the second consumer and to restrict the second consumer from editing the one or more first items within the data table that are owned by the first consumer; and
providing access to the data table to the first consumer in accordance with the first permission and to the second consumer in accordance with the second permission.

18. The physical computer-readable storage medium of claim 17, wherein the instructions further comprise:
receiving another request to associate a social field with an item in the data table; wherein the social field records a social input including one or more of an approval, a disapproval, a vote for and another vote against the item;
associating the item with the social field;
receiving a new social input associated with the item; and
recording the new social input in the social field.

19. The physical computer-readable storage medium memory device of claim 17, wherein the instructions further comprise:
receiving one or more data validation rules associated with a data field in the data table from the client application;
applying the one or more data validation rules to the data field in the data table.

\* \* \* \* \*